United States Patent
Yamamoto

(10) Patent No.: US 9,524,821 B2
(45) Date of Patent: Dec. 20, 2016

(54) REACTOR, CONVERTER, AND POWER CONVERSION DEVICE HAVING COUPLING COEFFICIENT ADJUSTER

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Shinichiro Yamamoto, Yokkaichi (JP)

(73) Assignees: AUTONETWORKS TECHNOLOGIES, LTD., Mie (JP); SUMITOMO WIRING SYSTEMS, LIMITED., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/652,682

(22) PCT Filed: Nov. 21, 2013

(86) PCT No.: PCT/JP2013/081417
§ 371 (c)(1),
(2) Date: Jun. 16, 2015

(87) PCT Pub. No.: WO2014/103579
PCT Pub. Date: Jul. 3, 2014

(65) Prior Publication Data
US 2016/0111203 A1    Apr. 21, 2016

(30) Foreign Application Priority Data

Dec. 27, 2012 (JP) ................................. 2012-284708

(51) Int. Cl.
*H01F 27/28* (2006.01)
*H01F 37/00* (2006.01)
(Continued)

(52) U.S. Cl.
CPC ............ *H01F 27/2885* (2013.01); *H01F 3/10* (2013.01); *H01F 27/2823* (2013.01);
(Continued)

(58) Field of Classification Search
CPC ... H01F 27/006; H01F 27/2823; H01F 27/2885; H01F 27/365; H02M 3/1584; H02M 7/537
(Continued)

(56) References Cited

U.S. PATENT DOCUMENTS 2,904,762 A * 9/1959 Schulz ............... H01F 27/362
336/171
2011/0267848 A1   11/2011 Satake et al.
(Continued)

FOREIGN PATENT DOCUMENTS

JP    H0335623 A      2/1991
JP    2002-075753 A   3/2002
(Continued)

OTHER PUBLICATIONS

F. Zheng, Y. Pei, Y. Liu, L. Wang, X. Yang and Z. Wang, "Design Coupled Inductors for Interleaved Converters Using a Three-Leg Core," in IEEE Transactions on Magnetics, vol. 44, No. 12, pp. 4697-4705, Dec. 2008.*
(Continued)

*Primary Examiner* — Fred E Finch, III
*Assistant Examiner* — Jye-June Lee
(74) *Attorney, Agent, or Firm* — Oliff PLC

(57) ABSTRACT

A reactor that is small and capable of adjusting a coupling coefficient is provided. A reactor includes a plurality of coils obtained by winding a winding wire and a core that magnetically couples the plurality of coils to each other. The plurality of coils is arranged parallel to each other such that the adjacent outer circumferential surfaces are opposed to each other. The core may include: (1) a plurality of magnetic leg portions around which the plurality of coils are respectively disposed and (2) a pair of coupling portions that are disposed at both end portions of the magnetic leg portions and that couple the end portions of the magnetic leg portions adjacent to each other. The reactor may further include a coupling coefficient adjustment means that adjusts a coupling coefficient between adjacent coils.

7 Claims, 4 Drawing Sheets

(51) Int. Cl.
*H01F 3/10* (2006.01)
*H01F 27/36* (2006.01)
*H02M 7/537* (2006.01)
*H02M 3/158* (2006.01)

(52) U.S. Cl.
CPC .......... *H01F 27/365* (2013.01); *H01F 37/00* (2013.01); *H02M 7/537* (2013.01); *B60L 2210/10* (2013.01); *H01F 2003/106* (2013.01); *H02M 3/1584* (2013.01); *Y02T 10/7216* (2013.01)

(58) Field of Classification Search
USPC .......... 336/84 R, 84 M, 183, 190, 191, 196, 224, 336/231, 223; 363/131
See application file for complete search history.

(56) References Cited

U.S. PATENT DOCUMENTS

2013/0099887 A1* 4/2013 Yamamoto .............. H01F 30/06 336/220
2013/0128622 A1 5/2013 Hasegawa et al.

FOREIGN PATENT DOCUMENTS

| | | |
|---|---|---|
| JP | 2010-080907 A | 4/2010 |
| JP | 2010-171357 A | 8/2010 |
| JP | 2010-171358 A | 8/2010 |
| JP | 2010-219254 A | 9/2010 |
| JP | 2011-205806 A | 10/2011 |
| JP | 2011-234549 A | 11/2011 |
| JP | WO 2011161772 A1 * 12/2011 ............. H01F 30/06 |
| JP | 2012-065453 A | 3/2012 |
| JP | 2012-239349 A | 12/2012 |
| WO | 2011161772 A1 | 12/2011 |

OTHER PUBLICATIONS

Mar. 18, 2015 International Preliminary Report on Patentability issued in International Patent Application No. PCT/JP2013/081417.

Feb. 25, 2014 Written Opinion issued in International Patent Application No. PCT/JP2013/081417.

Feb. 25, 2014 International Search Report issued in International Patent Application No. PCT/JP2013/081417.

* cited by examiner

REACTOR, CONVERTER, AND POWER CONVERSION DEVICE HAVING COUPLING COEFFICIENT ADJUSTER

CROSS-REFERENCE TO RELATED APPLICATIONS

This application is a National Stage application of International Application No. PCT/JP2013/081417, filed on Nov. 21, 2013, and claims priority to Japanese Patent Application No. 2012-284708, filed on Dec. 27, 2012, the disclosures of both of which are incorporated herein by reference in their entireties.

TECHNICAL FIELD

Embodiments of the present application relate to a reactor that is used in components of converters and power conversion devices, or the like to be mounted in vehicles such as hybrid cars, electric cars, and fuel cell cars, and particularly to a reactor that is small and capable of adjusting a coupling coefficient.

BACKGROUND

A reactor is one of the parts used in a voltage conversion circuit that boosts/lowers a voltage. For example, JP 2012-65453A discloses a reactor for a multiple-phase converter including a core and coils of a plurality of phases that are wound around the core and are magnetically coupled to each other. A reactor (10) for a two-phase converter (two-phase magnetic coupling reactor) described in JP 2012-65453A includes a core (12) and coils (14, 16) of two phases that are wound around the core (12). The core (12) includes a pair of T-shaped portions (20, 22) that each have a T shape and that have a base portion (26) and a central leg portion (28) that projects from the central portion of the base portion (26), and two linear I-shaped portions (24). The T-shaped portions (20, 22) are disposed such that the front ends of the central leg portions (28) are opposed to each other with a gap space (32) therebetween. The I-shaped portions (24) are each coupled to the end portions (end leg elements (30)) of the T-shaped portions (20, 22) via gap plates (18), and are disposed so as to be parallel to each other. In the core (12), two end leg portions (34) is constituted by the I-shaped portions (24) that are located on both sides of the central leg portion (28), and coils (14, 16) are respectively disposed around the end leg portions (34). With this configuration, the size of a reactor can be reduced compared with a single-phase reactor by disposing a plurality of coils in the same core and magnetically coupling the coils to each other.

Smaller sizes are in demand for converters (power conversion devices). In particular, the sizes of vehicle-mounted converters (power conversion devices) can be, in some embodiments, further reduced because an installation space is strictly limited.

A reactor in which a plurality of coils is disposed in the same core and magnetically coupled to each other uses an inductance as well as a coupling coefficient between the coils as important parameters. As described above, the reactor described in JP 2012-65453A is configured such that the core has three magnetic leg portions, namely, the central leg portion of the T-shaped portion and two end leg portions (I-shaped portions) located on both sides thereof, and the coils are respectively disposed in the end leg portions.

In the core, a coupling magnetic path that magnetically couples the coils to each other is formed using the base portions of the T-shaped portions and the end leg portions, and a leakage magnetic path in which a magnetic flux that is produced by the coils leaks is formed using the central leg portion. In this reactor, an inductance and a coupling coefficient can be adjusted by a gap space provided in the central leg portion. However, in this reactor, the core has the central leg portion for adjusting a coupling coefficient in addition to the end leg portions around which the coils are disposed, thus making it difficult to further reduce the size of the reactor.

SUMMARY OF THE INVENTION

According to embodiments of the present application, an object is to provide a reactor that is small and capable of adjusting a coupling coefficient. Another object of embodiments of the present application is to provide a converter equipped with this reactor, and a power conversion device equipped with this converter.

A reactor, according to embodiments of the present application, is a reactor including a plurality of coils obtained by winding a winding wire and a core that magnetically couples these coils to each other, the plurality of coils being arranged parallel to each other such that the adjacent outer circumferential surfaces are opposed to each other such that ends of the coils on one side are electrically connected to each other, and the plurality of coils are electrically connected in parallel. The core comprises a plurality of magnetic leg portions around which the plurality coils are respectively disposed and a pair of coupling portions that are disposed at both end portions of the magnetic leg portions and that couple the end portions of the magnetic leg portions adjacent to each other. The reactor further includes a coupling coefficient adjuster that adjusts a coupling coefficient between the adjacent coils.

The size of a reactor according to embodiments of the present application can be reduced.

BRIEF DESCRIPTION OF DRAWINGS

FIG. 1(A) is a schematic cross-sectional perspective view of coils and a core, and FIG. 1(B) is a schematic cross-sectional plan view.

DETAILED DESCRIPTION

Figure 1A:
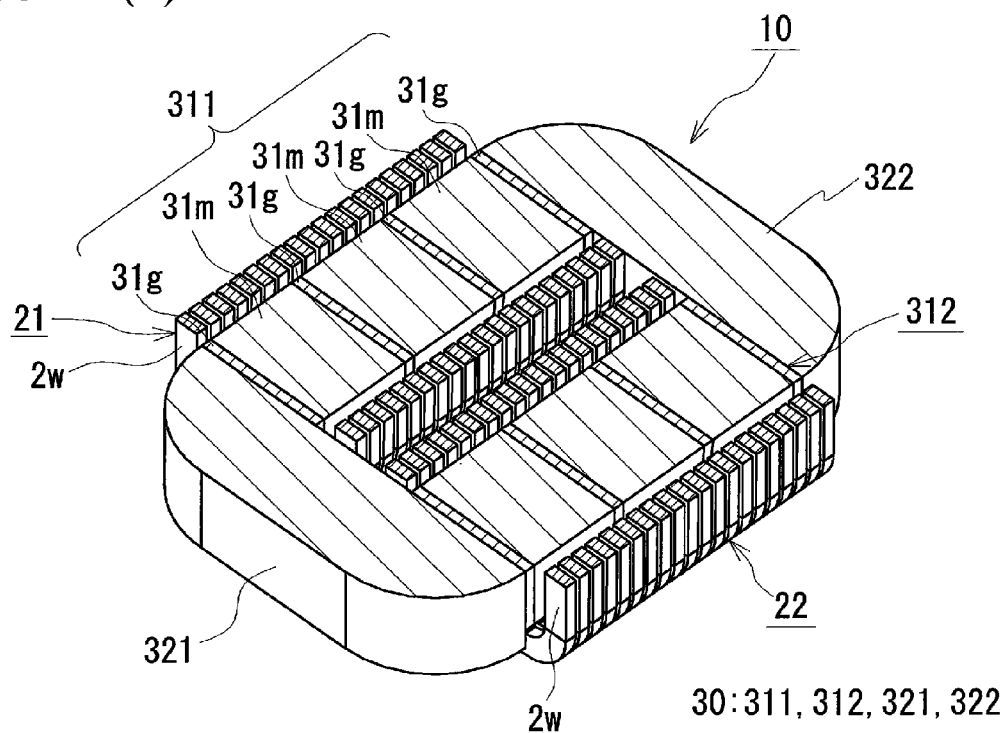
FIGS. 1(A) and 1(B) are diagrams for illustrating an example of a configuration of a reactor according to an embodiment of the present application.

In a reactor, according to embodiments of the present application, a core includes magnetic leg portions around which coils are disposed and coupling portions that couple the end portions of the magnetic leg portions, and thus the above-described objects are achieved. First, embodiments of the present application are listed and explained.

A reactor according to an embodiment includes a plurality of coils obtained by winding a winding wire and a core that magnetically couples these coils to each other. The plurality of coils is arranged parallel to each other such that the adjacent outer circumferential surfaces are opposed to each other. The core includes a plurality of magnetic leg portions around which the coils are respectively disposed and a pair of coupling portions that are disposed at both end portions of the magnetic leg portions and that couple the end portions of the magnetic leg portions adjacent to each other. The reactor further includes a coupling coefficient adjustment means that adjusts a coupling coefficient between the adjacent coils.

With the reactor of the above embodiment, the core includes the magnetic leg portions around which the coils are disposed and the coupling portions that couple the end portions of the magnetic leg portions. That is, the reactor of the embodiment has no central leg portion used to form a leakage magnetic path in order to adjust a coupling coefficient, unlike the reactor described in Japanese Patent Appl. No. 2012-65453A. Accordingly, the size of the reactor of the embodiment can be reduced compared with a conventional reactor. In addition, the core includes the coupling coefficient adjustment means, thus making it possible to adjust the coupling coefficient between the coils.

Examples of the above-described coupling coefficient adjustment means include arrangements (1) to (4) shown below.

(1) An arrangement including a magnetic shielding plate that is disposed between the adjacent coils;

(2) An arrangement having a dense winding portion that has a dense winding pitch and a loose winding portion that has a looser winding pitch than the dense winding portion, the dense winding portion and the loose winding portion being provided in at least one of the adjacent coils;

(3) An arrangement having a small-diameter portion that has a small winding diameter and a large-diameter portion that has a larger winding diameter than the small-diameter portion, the small-diameter portion and the large-diameter portion being provided in at least one of the adjacent coils;

(4) An arrangement including a magnetic gap portion provided in at least one of the coupling portions.

Arrangement (1) above includes the magnetic shielding plate that is disposed between the adjacent coils, thus adjusting the coupling coefficient. In the case where a pair of coils to be magnetically coupled are respectively disposed around the magnetic leg portions so as to be adjacent to each other, for example, a leakage magnetic flux may leak from one magnetic leg portion to the outside through between the winding wires (between the turns) of the coil, and a portion of the leakage magnetic flux may move between the coils and transfer to the other magnetic leg portion. With arrangement (1) above, the magnetic shielding plate disposed between the coils can be used to shield and suppress the leakage magnetic flux, which moves between the coils and transfers from one magnetic leg portion to the other magnetic leg portion, thus making it possible to increase the coupling coefficient between the coils. Thus, it is possible to adjust the coupling coefficient. When a leakage magnetic flux is made to be likely to leak from the magnetic leg portion by providing a magnetic gap portion such as an air gap or a gap material constituted by a non-magnetic material in the magnetic leg portion or by forming the magnetic leg portion using a soft magnetic material having a low magnetic permeability, for example, it is possible to make an adjusting allowance of the coupling coefficient larger.

Arrangement (2) above has a dense winding portion that has a dense winding pitch and a loose winding portion that has a looser winding pitch than the dense winding portion, the dense winding portion and the loose winding portion being provided in at least one of the adjacent coils, thus adjusting the coupling coefficient. In general, in the dense winding portion in which the winding pitch of the coil is dense, gaps between the winding wires (gaps between the turns) are small and the leakage magnetic flux is not likely to leak. On the other hand, in the loose winding portion in which the winding pitch of the coil is loose, gaps between the winding wires (gaps between the turns) are large and the leakage magnetic flux is likely to leak. With arrangement (2) above, the leakage magnetic flux is decreased due to the coil having the dense winding portion at a position corresponding to a portion of the magnetic leg portion from which the leakage magnetic flux is likely to leak, thus making it possible to increase the coupling coefficient between the coils. Alternatively, the leakage magnetic flux is increased due to the coil having the loose winding portion at a position corresponding to a portion of the magnetic leg portion from which the leakage magnetic flux is likely to leak, thus making it possible to reduce the coupling coefficient between the coils. Thus, it is possible to adjust the coupling coefficient. Examples of the position of the magnetic leg portion at which the leakage magnetic flux is likely to leak include the central portion of the magnetic leg portion in the longitudinal direction in the case where the magnetic leg portion is made of a uniform soft magnetic material, and a magnetic gap portion in the case where the above-described magnetic gap portion is provided in the magnetic leg portion.

Arrangement (3) above has a small-diameter portion that has a small winding diameter and a large-diameter portion that has a larger winding diameter than the small-diameter portion, the small-diameter portion and the large-diameter portion being provided in at least one of the adjacent coils, thus adjusting the coupling coefficient. In general, the larger the winding diameter of the coil becomes, the more a leakage magnetic flux that does not pass through the magnetic leg portion is likely to leak. With arrangement (3) above, the leakage magnetic flux increases due to the large-diameter portion provided in the coil, thus making it possible to reduce the coupling coefficient between the coils. Thus, it is possible to adjust the coupling coefficient.

Arrangement (4) above includes a magnetic gap portion provided in at least one of the coupling portions, thus adjusting the coupling coefficient. With this arrangement, the leakage magnetic flux increases by providing the magnetic gap portion in the coupling portion, thus making it possible to reduce the coupling coefficient between the coils. Thus, it is possible to adjust the coupling coefficient.

Arrangements (1) to (4) above can be used alone or in combination. The coupling coefficient between the coils can be, in some embodiments, adjusted to 0.4 to 0.9, for example.

A converter according to an embodiment includes the reactor of the above-described embodiment. Including the reactor of the embodiment whose size can be reduced enables the size of the converter of the embodiment to be reduced.

A power conversion device according to an embodiment includes the converter of the above-described embodiment. Including the converter of the embodiment equipped with the reactor of the embodiment whose size can be reduced enables the size of the power conversion device of the embodiment to be reduced.

In the drawings, identical reference numerals refer to identical or corresponding elements.

Here, first, a coil and a core that are included in a reactor according to an embodiment of the present application as basic compositions will be described. Next, specific embodiments of a coupling coefficient adjustment means included in the reactor according to an embodiment of the present application will be described.

Configuration of a Reactor

Figure 1B:
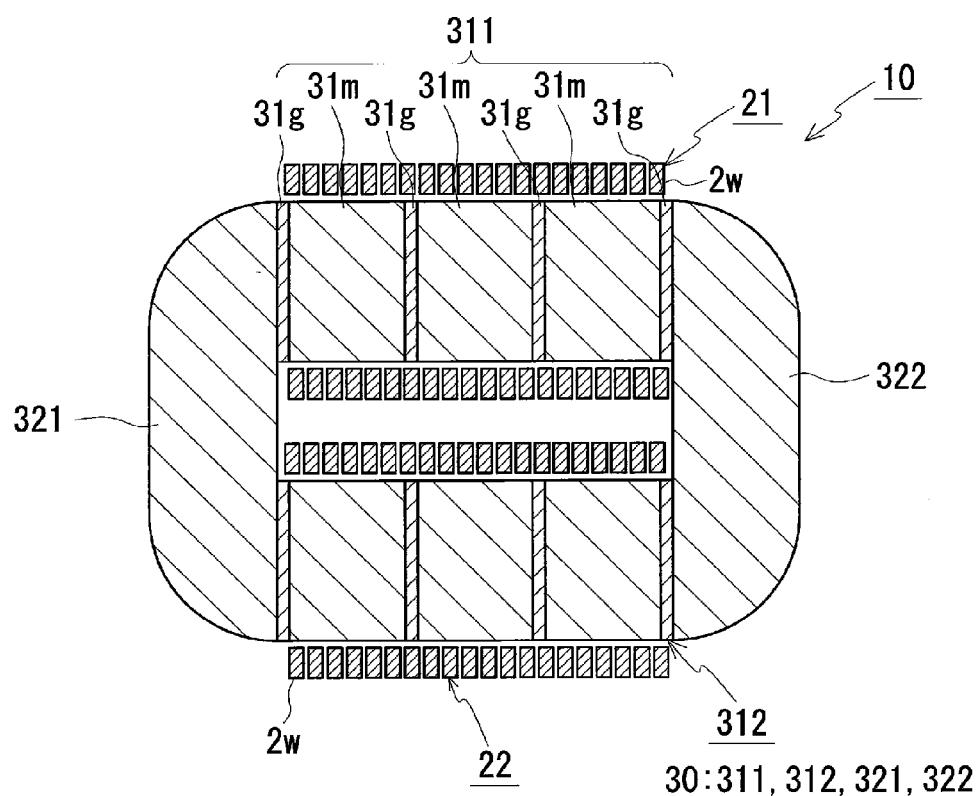

FIGS. 1(A) and 1(B) show an example of the basic configuration of the reactor of an embodiment. A reactor 10 includes a first coil 21, a second coil 22, and an annular core 30 that magnetically couples the first coil 21 and the second coil 22. It should be noted that FIG. 1(A) is a cross-sectional perspective view of the coils 21 and 22 and the core 30 that are cut in substantially half in the height direction for the sake of convenience in the description.

The first coil 21 and the second coil 22 are each obtained by spirally winding a winding wire 2w, and are arranged parallel to each other such that the directions of the axes thereof are parallel to each other and the outer circumferential surfaces thereof are opposed to each other. The coils 21 and 22 have the same shape, and each have a uniform winding pitch and a uniform winding diameter between one end side and the other end side in the axial direction. The winding wire 2w is a coated rectangular wire obtained by providing an insulating coating made of enamel, polyamide-imide resin, or the like on the surface of a rectangular wire made of copper or copper alloy, or aluminum or aluminum alloy. The coils 21 and 22 are edgewise coils formed in a prismatic tubular shape by winding the winding wire 2w, which is a coated rectangular wire, in an edgewise manner. One end of the coil 21 and one end of the coil 22 are electrically connected to each other.

The core 30 magnetically couples the first coil 21 and the second coil 22. The core 30 includes a pair of magnetic leg portions 311 and 312 that are located inside the coils 21 and 22 and around which the coils 21 and 22 are respectively disposed, and a pair of coupling portions 321 and 322 that are disposed at the both end portions of the magnetic leg portions 311 and 312 and couple the end portions of the magnetic leg portions 311 and 312. The core 30 is configured so as to have an annular shape by coupling the respective inner end surfaces of the coupling portions 321 and 322 to the end surfaces of the magnetic leg portions 311 and 312, which are arranged parallel to each other, and the magnetic leg portions 311 and 312 and the coupling portions 321 and 322 form a coupling magnetic path that magnetically couples the coils 21 and 22.

Each of the magnetic leg portions 311 and 312 has a prismatic shape, and is formed by alternately stacking core pieces 31m made of a soft magnetic material and gap materials 31g constituted by a material that has a smaller relative magnetic permeability than the core piece 31m. The core pieces 31m and the gap materials 31g can be integrated using an adhesive, for example. Each of the coupling portions 321 and 322 has a substantially trapezoidal shape (trapezoidal shape in which a cross-sectional area decreases from the inner end surface that is coupled to the end surfaces of the magnetic leg portions 311 and 312 toward the outside), and is a core piece made of a soft magnetic material.

The core pieces constituting the magnetic leg portions 311 and 312 and the coupling portions 321 and 322 are each formed using a molded body made from soft magnetic powder e.g. an iron group metal such as iron, an alloy thereof, or an oxide containing iron, a stacked plate body obtained by stacking a plurality of magnetic thin plates having an insulating coating (e.g., electromagnetic steel plates such as silicon steel plates), or the like. Examples of the above-described molded body includes a powder molded body, a sintered body, and a composite material obtained by molding a mixture containing soft magnetic powder and a resin by injection molding, cast molding, or the like. Such a molded body, in particular, the composite material, can also be caused to have a low magnetic permeability, such as a relative magnetic permeability of 5 to 50, by reducing the content of the soft magnetic powder, for example. In this example, the core pieces (the core pieces 31m and the coupling portions 321 and 322) are each formed using a powder molded body made from soft magnetic powder of iron, steel, or the like.

The gap materials 31g are formed using a non-magnetic material such as alumina or unsaturated polyester. The relative magnetic permeability of the magnetic leg portions 311 and 312 (core 30) is adjusted by providing the gap materials 31g in the magnetic leg portions 311 and 312 in this example, but if the core pieces are formed using a composite material having a low magnetic permeability, for example, it is also possible that a predetermined relative magnetic permeability is achieved without providing the gap materials, and that the magnetic leg portions 311 and 312 are each constituted by one core piece. Moreover, the core pieces are made of a uniform material so as to have the same specification (powder molded body), but it is also possible that the plurality of core pieces 31m constituting the magnetic leg portions 311 and 312 have different magnetic properties and different specifications, and that the core pieces 31m and the coupling portions 321 and 322 have different magnetic properties and different specifications. In addition, it is also possible that the gap material 31g is formed using a material that has a lower magnetic permeability than that of the core piece 31m, such as a composite material that contains little soft magnetic powder.

Next, specific embodiments of a coupling coefficient adjustment means that adjusts a coupling coefficient between the coils adjacent to each other will be described. It should be noted that in Embodiments 1 to 4 below, the reactor has the same basic configuration as that of the above reactor 10 shown in FIG. 1, and the differences will be mainly described.

Embodiment 1

A Magnetic Shielding Plate is Disposed Between the Coils

Figure 2:
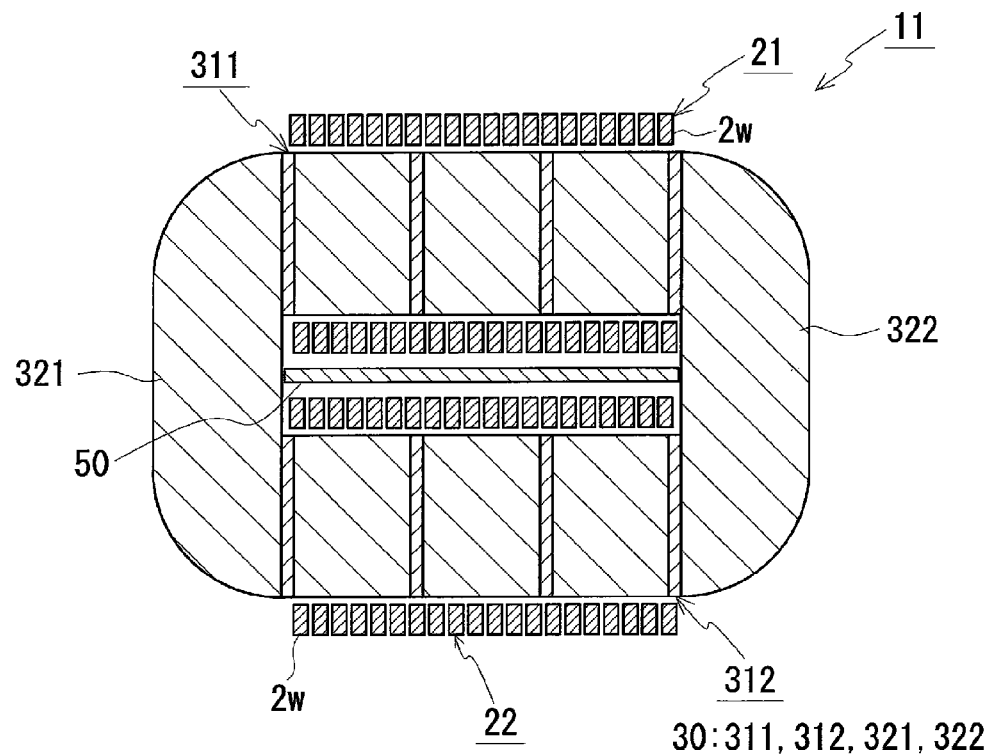
FIG. 2 is a schematic cross-sectional plan view of a reactor according to Embodiment 1.

Embodiment 1 describes an arrangement including a magnetic shielding plate that is disposed between the adjacent coils, as a coupling coefficient adjustment means. In a reactor 11 according to Embodiment 1 shown in FIG. 2, a magnetic shielding plate 50 is disposed between the first coil 21 and the second coil 22 that are respectively disposed around the magnetic leg portions 311 and 312. The magnetic shielding plate 50 is made of a non-magnetic metal material, and stainless steel, aluminum, or an aluminum alloy can be favorably used, for example. In this example, an aluminum plate (magnetic shielding plate 50) is disposed between the coils 21 and 22 in the longitudinal direction of the magnetic leg portions 311 and 312. Disposing the magnetic shielding plate 50 between the coils 21 and 22 in this manner makes it possible to use the magnetic shielding plate 50 to absorb and suppress a leakage magnetic flux that moves between the coils 21 and 22 and transfers from one magnetic leg portion (311 or 312) to the other magnetic leg portion (312 or 311). Thus, it is possible to increase the coupling coefficient between the coils 21 and 22.

Here, the coupling coefficient can be adjusted by changing the thickness, the area, or the position of the magnetic shielding plate 50. The thickness of the magnetic shielding plate 50 can be set as appropriate as long as the magnetic shielding plate 50 can be disposed between the coils 21 and 22 and suppress the leakage magnetic flux. In general, the size of a gap between the coils 21 and 22 is about 2 mm. The thicker the magnetic shielding plate 50 is, the more the effect of suppressing the leakage magnetic flux is enhanced. However, even if the magnetic shielding plate 50 is twice or more as thick as a skin depth with respect to the frequency of currents flowing in the coils 21 and 22, the enhancement of the effect of suppressing the leakage magnetic flux is small. Therefore, the thickness of the magnetic shielding plate 50 is preferably one time or more and twice or less the thickness of the skin depth, and is preferably set to 1 mm or more and 2 mm or less, for example. Here, in the case where the thickness of the magnetic shielding plate 50 is the same (one time) as that of the skin depth, a magnetic flux that passes through the magnetic shielding plate 50 can be reduced by $1/e$ ($e \approx 2.71$) times, that is, by about 63%, and in the case where the thickness of the magnetic shielding plate 50 is twice the thickness of the skin depth, the magnetic flux can be reduced by $1/e^2$ times, that is, by about 87%. On the other hand, the longer the magnetic shielding plate 50 is, the more the area of the magnetic shielding plate 50 that interacts with the leakage magnetic flux increases, and therefore, the amount of the leakage magnetic flux absorbed by the magnetic shielding plate 50 increases, thus making it possible to increase the coupling coefficient between the coils 21 and 22. Furthermore, the higher the magnetic shielding plate 50 is, the more the area of the magnetic shielding plate 50 that interacts with the leakage magnetic flux also increases, thus making it possible to increase the coupling coefficient between the coils 21 and 22.

Furthermore, the coupling coefficient can also be adjusted by changing the position of the magnetic shielding plate 50. In the case where the gap materials 31g are provided in the magnetic leg portions 311 and 312 as in this example, the leakage magnetic flux is likely to leak from the gap materials 31g, and therefore, the leakage magnetic flux can be effectively suppressed by disposing magnetic shielding plates 50 at the positions corresponding to the gap materials 31g in the magnetic leg portions 311 and 312. In the case where the magnetic leg portions 311 and 312 are each made of a composite material having a low magnetic permeability and constituted by one core piece as described above, for example, the leakage magnetic flux is likely to leak from the central portion of the magnetic leg portions 311 and 312 in the longitudinal direction, and therefore, it is easy to effectively suppress the leakage magnetic flux when the magnetic shielding plate 50 is locally disposed at the position corresponding to the central portion of the magnetic leg portions 311 and 312. It should be noted that in the case where the reactor 11 is accommodated in a case (not shown), the magnetic shielding plate 50 can be fixed by disposing the magnetic shielding plate 50 between the coils 21 and 22 and by then sealing the magnetic shielding plate 50 with a sealing resin. Alternatively, the magnetic shielding plate 50 may be fixed to the bottom plate of the case in advance using an insulating adhesive.

Embodiment 2

The Coil has a Dense Winding Portion and a Loose Winding Portion

Figure 3:
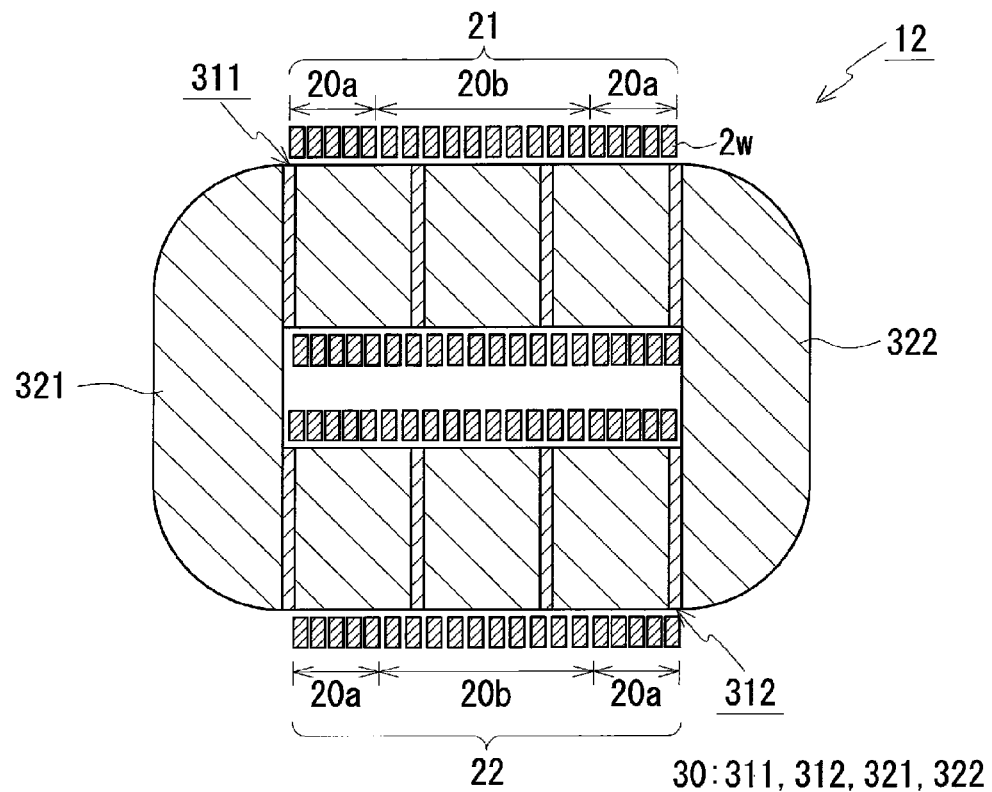
FIG. 3 is a schematic cross-sectional plan view of a reactor according to Embodiment 2.

Embodiment 2 describes an arrangement having, as a coupling coefficient adjustment means, a dense winding portion that has a dense winding pitch and a loose winding portion that has a looser winding pitch than the dense winding portion, the dense winding portion and the loose winding portion being provided in at least one of the adjacent coils. In a reactor 12 according to Embodiment 2 shown in FIG. 3, the first coil 21 and the second coil 22, which are respectively disposed around the magnetic leg portions 311 and 312, each have dense winding portions 20a that have a dense winding pitch and a loose winding portion 20b that has a looser winding pitch than the dense winding portion 20a. In this example, the dense winding portion 20a, the loose winding portion 20b, and the dense winding portion 20a are formed in the stated order from one end side to the other end side in the axial direction in each of the coils 21 and 22, and the loose winding portions 20b are provided at the positions corresponding to the central portions including the gap materials 31g of the magnetic leg portions 311 and 312. Moreover, in each of the coils 21 and 22, the total winding number in the dense winding portions 20a at both end portions and the total winding number in the loose winding portion 20b in the central portion are the same. The leakage magnetic flux increases due to the coils 21 and 22 having the loose winding portions 20b at the positions corresponding to the portions of the magnetic leg portions 311 and 312 (gap materials 31g) from which the leakage magnetic flux is likely to leak in this manner, thus making it possible to reduce the coupling coefficient between the coils 21 and 22. In contrast, if the dense winding portions 20a are locally provided at the positions corresponding to the portions of the magnetic leg portions 311 and 312 (gap materials 31g) from which the leakage magnetic flux is likely to leak, the leakage magnetic flux decreases, thus making it possible to increase the coupling coefficient between the coils 21 and 22.

Here, the coupling coefficient can be adjusted by changing the winding pitches, the winding numbers, or the positions of the dense winding portions 20a and the loose winding portions 20b of the coils 21 and 22. The winding pitches of the dense winding portions 20a and the loose winding portions 20b of the coils 21 and 22 can be set as appropriate as long as the coils 21 and 22 can be disposed around the magnetic leg portions 311 and 312. In general, the size of each of the gaps between the winding wires 2w (gaps of the turns) is about 0.3 mm. When this is taken as a standard gap, the size of each of the gaps between the winding wires 2w in the loose winding portions 20b can be, in some embodiments, set to +0.1 mm or more and less than +0.5 mm, for example, and that the size of each of the gaps between the winding wires 2w in the dense winding portions 20a can be, in some embodiments, set to −0.1 mm or more and less than −0.3 mm, for example. That is, the winding pitch of the loose winding portion 20b can be, in some embodiments, made looser than that of the dense winding portion 20a such that the size of each of the gaps between the winding wires 2w in the loose winding portions 20b becomes larger by 0.2 mm or more and less than 0.8 mm than that in the dense winding portion 20a, for example. It should be noted that if insulating spacers or the like are interposed between the winding wires 2w in the dense winding portions 20a or the loose winding portions 20b in the coils 21 and 22, the gaps between the winding wires 2w can be reliably maintained. In the case where the coils 21 and 22 are each wound around a tubular insulating bobbin (not shown) and the bobbins are respectively disposed between the coils 21 and 22 and the magnetic leg portions 311 and 312, for example, a spacer can be, in some embodiments, provided on the outer circumferential surface of the bobbin.

Embodiment 3

The Coil has a Small-Diameter Portion and a Large-Diameter Portion

Figure 4:
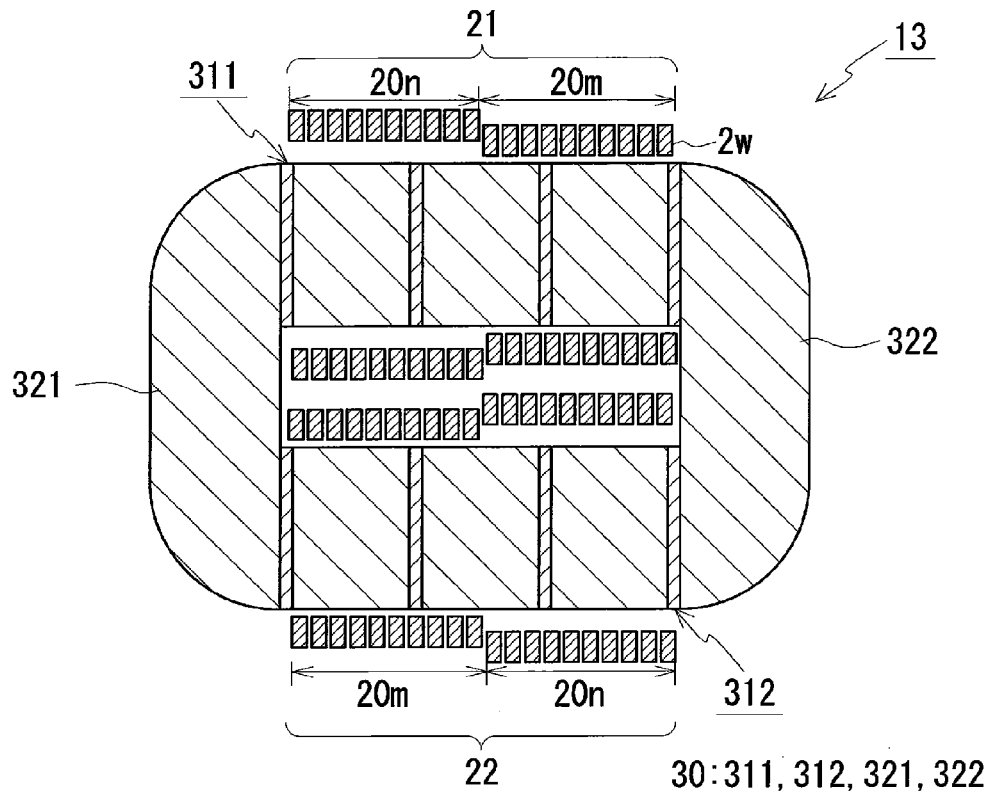
FIG. 4 is a schematic cross-sectional plan view of a reactor according to Embodiment 3.

Embodiment 3 describes an arrangement having, as a coupling coefficient adjustment means, a small-diameter portion that has a small winding diameter and a large-diameter portion that has a larger winding diameter than the small-diameter portion, the small-diameter portion and the large-diameter portion being provided in at least one of the adjacent coils. In a reactor 13 according to Embodiment 3 shown in FIG. 4, the first coil 21 and the second coil 22, which are respectively disposed around the magnetic leg portions 311 and 312, each have a small-diameter portion 20$m$ that has a small winding diameter and a large-diameter portion 20$n$ that has a larger winding diameter than the small-diameter portion 20$m$. In this example, the large-diameter portion 20$n$ and the small-diameter portion 20$m$ are formed in the stated order from one end side to the other end side in the axial direction in the first coil 21, which is one of the coils, and the small-diameter portion 20$m$ and the large-diameter portion 20$n$ are formed in the stated order from one end side to the other end side in the axial direction in the second coil 22, which is the other of the coils. That is, the positions of the small-diameter portion 20$m$ and the large-diameter portion 20$n$ of the first coil 21 alternate with those of the second coil 22. Moreover, in the coils 21 and 22, the section of the small-diameter portion 20$m$ and the section of the large-diameter portion 20$n$ are identical. The leakage magnetic flux increases due to the coils 21 and 22 having the large-diameter portions 20$n$ in this manner, thus making it possible to reduce the coupling coefficient between the coils 21 and 22.

Here, the coupling coefficient can be adjusted by changing the winding diameters or the sections of the small-diameter portion 20$m$ and the large-diameter portion 20$n$ of the coils 21 and 22. The larger the winding diameters of the large-diameter portions 20$n$ of the coils 21 and 22 become, the more the leakage magnetic flux increases, and therefore, the coupling coefficient between the coils 21 and 22 can be reduced. However, the gap between the magnetic leg portions 311 and 312 correspondingly becomes large, and thus the size of the core 30 (reactor 13) increases. Therefore, the winding diameter of the large-diameter portion 20$n$ can be, in some embodiments, made larger by 1 mm or more and less than 5 mm than that of the small-diameter portion 20$m$, for example. The longer the sections of the large-diameter portions 20$n$ of the coils 21 and 22 become, the more the leakage magnetic flux increases, and therefore, the coupling coefficient between the coils 21 and 22 can be reduced. However, if the length of the section of the large-diameter portion 20$n$ is more than half of that of the coils 21 and 22 in the axial direction, there is a risk that the large-diameter portions 20$n$ interfere with each other. As in this example, by causing the length of the section of the large-diameter portion 20$n$ to be half or less of that of the coils 21 and 22 in the axial direction and by causing the positions of the small-diameter portion 20$m$ and the large-diameter portion 20$n$ of the first coil 21 to alternate with those of the second coil 22, the gap between the magnetic leg portions 311 and 312 can be made as small as possible while avoiding the interference between the large-diameter portions 20$n$.

Embodiment 4

A Magnetic Gap Portion is Provided in a Coupling Portion

Figure 5:
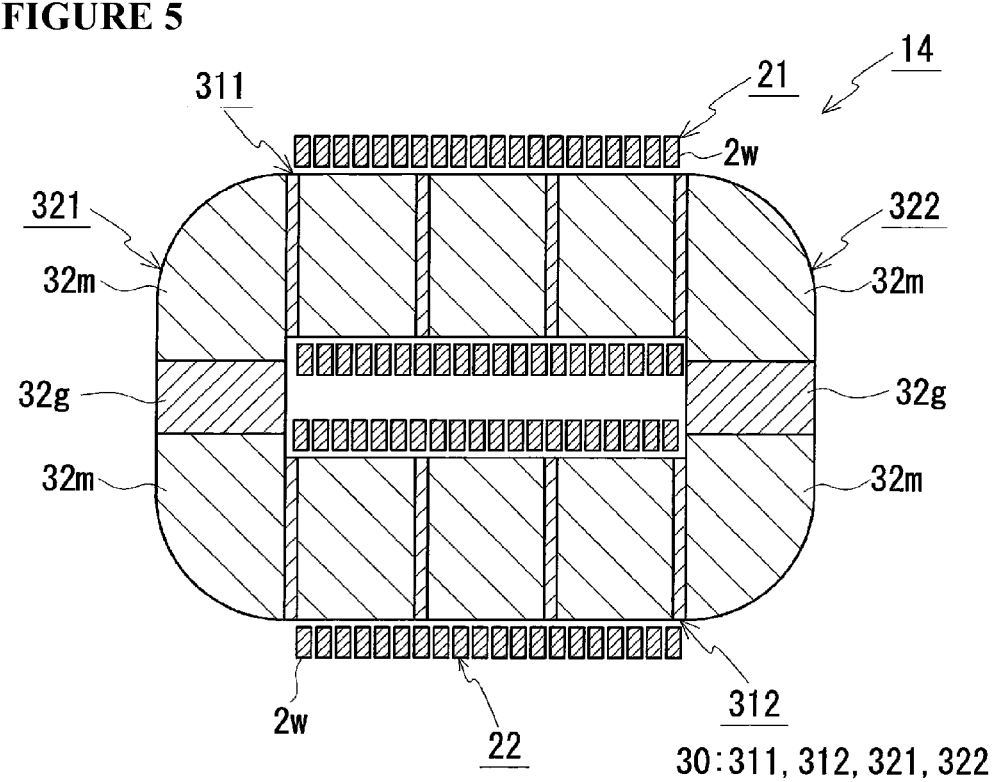
FIG. 5 is a schematic cross-sectional plan view of a reactor according to Embodiment 4.

Embodiment 4 describes an arrangement including a magnetic gap portion provided in at least one of the coupling portions, as a coupling coefficient adjustment means. In a reactor 14 according to Embodiment 4 shown in FIG. 5, magnetic gap portions 32$g$ are provided in the intermediate portions of the coupling portions 321 and 322, which couple the end portions of the magnetic leg portions 311 and 312 around which the first coil 21 and the second coil 22 are disposed. The magnetic gap portions 32$g$ are each made of a gap material constituted by a non-magnetic material in the same manner as the gap materials 31$g$ of the magnetic leg portions 311 and 322. In this example, the gap material (magnetic gap portion 32$g$) is disposed between two core pieces 32$m$ constituting the coupling portions 321 or 322, and the gap material and the two core pieces 32$m$ are integrated using an adhesive. A material that has a lower magnetic permeability than the core pieces 32$m$, such as a composite material that contains little soft magnetic powder, for example, can also be used in the gap material. Alternatively, the lower surfaces of the coils 21 and 22 or the coupling portions 321 and 322 (core pieces 32$m$) are fixed, using a fastening member such as an adhesive or a bolt, to a plate member (not shown) on which the reactor 14 is to be placed such that a gap is formed between the core pieces 32$m$ of each of the coupling portions 321 and 322, and an air gap is provided between the core pieces 32$m$ and thus may be used as the magnetic gap portion. The leakage magnetic flux increases due to the coupling portions 321 and 322 being provided with the magnetic gap portions 32$g$ in this manner, thus making it possible to reduce the coupling coefficient between the coils 21 and 22.

Here, the coupling coefficient can be adjusted by changing the size (gap length) of the magnetic gap portion 32$g$ of each of the coupling portions 321 and 322. Although each of the coupling portions 321 and 322 is provided with one magnetic gap portion 32$g$ in this example, each of the coupling portions 321 and 322 can also be provided with a plurality of magnetic gap portions 32$g$ by further dividing the coupling portions 321 and 322 into a plurality of core pieces 32$m$ and by providing the magnetic gap portions 32$g$ between the core pieces 32$m$. Furthermore, although both coupling portions 321 and 322 are provided with the magnetic gap portion 32$g$, only one coupling portion (321 or 322) may be provided with the magnetic gap portion 32$g$ or the size and the number of the magnetic gap portion 32$g$ may be changed in the coupling portions 321 and 322.

The arrangements, which have been described in Embodiments 1 to 4 above, of the coupling coefficient adjustment means shown in FIGS. 2 to 5 can be implemented alone or in combination. In the reactors 11 to 14 of Embodiments 1 to 4 above, the coupling coefficient between the coils 21 and 22, which are magnetically coupled to each other, can be, in some embodiments, adjusted to 0.4 to 0.9, for example, by the coupling coefficient adjustment means.

Embodiment 5

The reactors 11 to 14 of Embodiments 1 to 4 can be used in components of converters to be mounted in vehicles and components of power conversion devices equipped with this converter. The above reactors can be favorably used in an application in which a current is conducted under the condition in which the maximum current (DC) is about 100 to 1000 A, the average voltage is about 100 to 1000 V, and the frequency to be used is about 5 to 100 kHz, namely, typically in components of vehicle-mounted converters and vehicle-mounted power conversion devices to be mounted in hybrid cars, electric cars, or the like.

Configuration of a Converter (Power Conversion Device)

Figure 6:
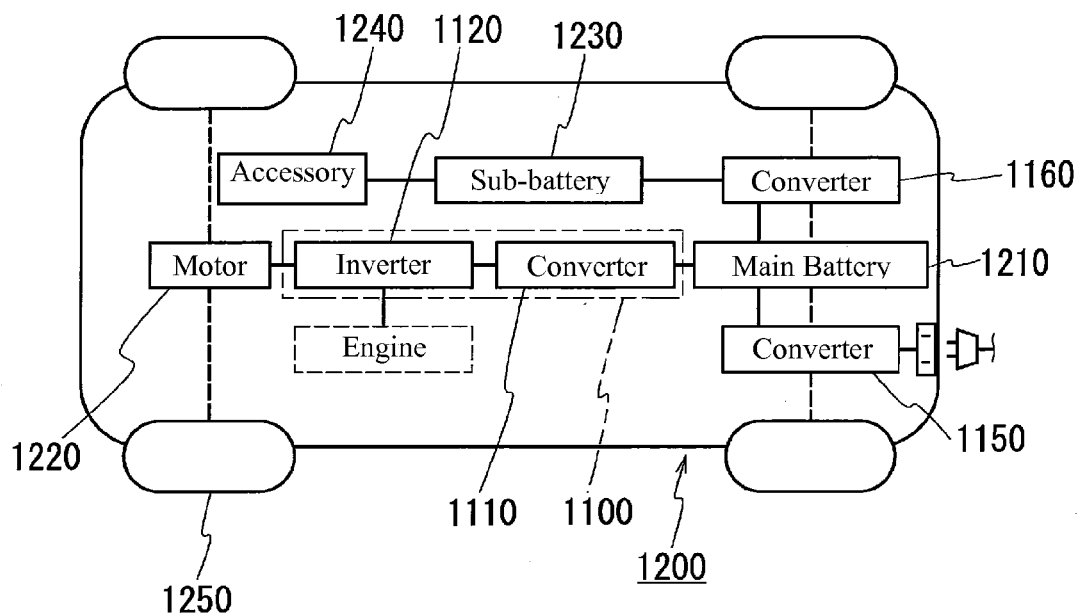
FIG. 6 is a schematic configuration diagram illustrating a power source system of a hybrid car.

As shown in FIG. 6, a vehicle 1200 such as a hybrid car or an electric car includes a main battery 1210, a power conversion device 1100 that is connected to the main battery 1210, and a motor (load) 1220 that is driven using electric power supplied by the main battery 1210 and is used for traveling, for example. The motor 1220 is typically a three-phase AC motor. The motor 1220 drives wheels 1250 during traveling, and functions as a power generator during regeneration. In a hybrid car, the vehicle 1200 includes an engine in addition to the motor 1220. It should be noted that although an inlet is shown as a charging part of the vehicle 1200 in FIG. 6, an arrangement including a plug is also possible.

The power conversion device 1100 has a converter 1110 that is connected to the main battery 1210 and an inverter 1120 that is connected to the converter 1110 and interconverts DC and AC. In this example, while the vehicle 1200 travels, the converter 1110 boosts the DC voltage (input voltage) of the main battery 1210 of about 200 to 300 V to about 400 to 700 V, and supplies electricity to the inverter 1120. During regeneration, the converter 1110 lowers the DC voltage (input voltage) output from the motor 1220 via the inverter 1120 to a DC voltage suitable for the main battery 1210, and charges the main battery 1210. While the vehicle 1200 travels, the inverter 1120 converts the DC boosted by the converter 1110 to a predetermined AC, and supplies electricity to the motor 1220. During regeneration, the inverter 1120 converts the AC output from the motor 1220 to DC, and outputs the DC to the converter 1110.

Figure 7:
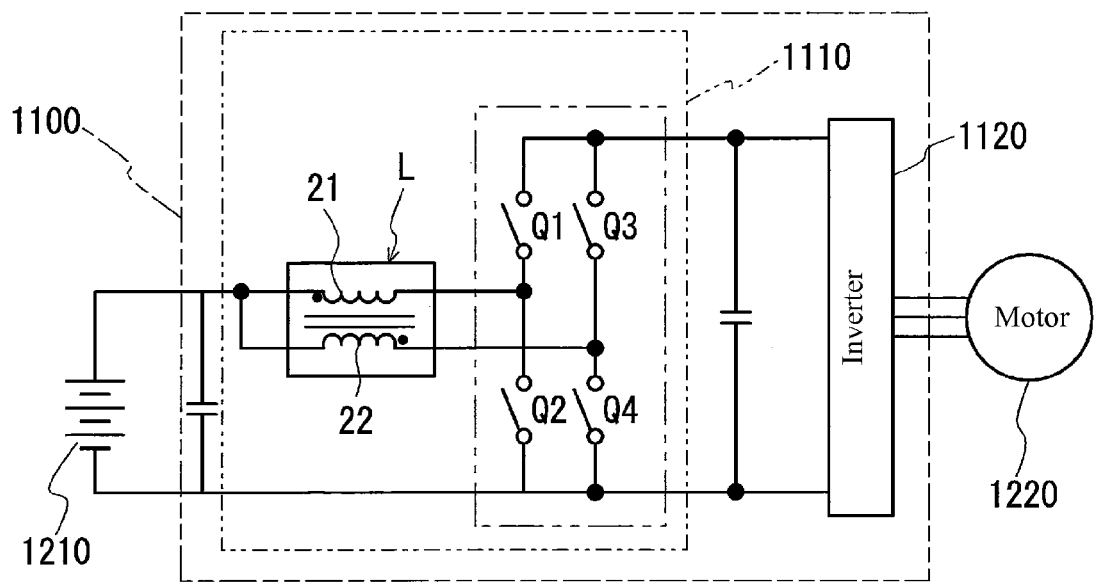
FIG. 7 is a schematic circuit diagram illustrating an example of a power conversion device of an embodiment equipped with the converter according to the embodiment.

The converter 1110 includes a plurality of switching elements Q1 to Q4, a driving circuit (not shown) that controls the operation of the switching elements Q1 to Q4, and a reactor L as shown in FIG. 7, and converts input voltage (boosts and lowers the voltage here) with the repeated ON/OFF operation (switching operation). Power devices such as field effect transistors (FETs) or insulated gate bipolar transistors (IGBTs) can be used as the switching elements Q1 to Q4. The reactor L has a function for smoothing the change in a current that increases/decreases due to the switching operation by utilizing properties of a coil of preventing the change in a current that tends to flow into a circuit. The reactors 11 to 14 of Embodiments 1 to 4 above are used as the reactor L, and the coupling coefficient between the coils 21 and 22, which are magnetically coupled to each other, is adjusted by the coupling coefficient adjustment means described in Embodiments 1 to 4. Since the reactors 11 to 14 are small, the size of the converter 1110 equipped with any of the reactors 11 to 14 or the power conversion device 1100 can be reduced.

In this example, one end of the coil 21 and one end of the coil 22 are connected to the positive electrode side of the main battery 1210, the coils 21 and 22 constituting the reactor L. The other end of the coil 21, which is one of the coils, is connected to the middle point of a series switching circuit obtained by connecting the switching elements Q1 and Q2 in series, and the other end of the coil 22, which is the other of the coils, is connected to the middle point of a series switching circuit obtained by connecting the switching elements Q3 and Q4 in series. The phases of currents flowing in the coils 21 and 22 are shifted by 180° by the driving circuit switching the switching elements Q1 to Q4, and thus the coils 21 and 22 are magnetically coupled to each other in the reverse direction.

It should be noted that in addition to the converter 1110, the vehicle 1200 includes an electricity supply device converter 1150 that is connected to the main battery 1210, and an accessory power source converter 1160 that is connected to the main battery 1210 and a sub-battery 1230 that serves as a power source for an accessory 1240, and that converts a high voltage of the main battery 1210 to a low voltage (FIG. 6). Although the converter 1110 typically performs a DC-DC conversion, the electricity supply device converter 1150 and the accessory power source converter 1160 perform an AC-DC conversion. Some electricity supply device converters 1150 perform a DC-DC conversion. A reactor that has a configuration similar to those of the reactors 11 to 14 of Embodiments 1 to 4 above and whose size and shape are changed as appropriate can be used as the reactors in the electricity supply device converter 1150 and the accessory power source converter 1160. The reactors 11 to 14 of Embodiments 1 to 4 above can also be used in a converter that converts input power and only boosts the voltage or a converter that converts input power and only lowers the voltage.

A reactor according to embodiments of the present application can be favorably used in various types of converters such as vehicle-mounted converters (typically DC-DC converters) to be mounted in vehicles e.g. hybrid cars, plug-in hybrid cars, electric cars and fuel cell cars, and converters for an air conditioner, and components of power conversion devices.

Further, although specific embodiments have been illustrated and described herein, those of ordinary skill in the art appreciate that any arrangement which is calculated to achieve the same purpose may be substituted for the specific embodiments shown and that embodiments of the invention have other applications in other environments. The present application is intended to cover any adaptations or variations of the present inventions. For example, although a two-phase magnetic coupling reactor that includes two coils 21 and 22 and in which the two coils 21 and 22 are magnetically coupled to each other has been taken as an example and described in the above embodiments, embodiments of the present application can be applied to a reactor including three or more coils. Moreover, currents flowing in the coils 21 and 22 may have the same phase or the coils 21 and 22 may be magnetically coupled to each other in the forward direction. The following claims are in no way intended to limit the scope of embodiments of the invention to the specific embodiments described herein.

List of Reference Numerals 10, 11, 12, 13, 14 Reactor
21 First coil
22 Second coil
2w Winding wire
20a Dense winding portion
20b Loose winding portion
20m Small-diameter portion
20n Large-diameter portion
30 Core
311, 312 Magnetic leg portion
321, 322 Coupling portion
31m, 32m Core piece
31g Gap material
32g Magnetic gap portion
50 Magnetic shielding plate
1100 Power conversion device
1110 Converter
1120 Inverter
1150 Electricity supply device converter
1160 Accessory power source converter
1200 Vehicle
1210 Main battery
1220 Motor
1230 Sub-battery
1240 Accessory
1250 Wheel
L Reactor
Q1-Q4 Switching element

The invention claimed is:

1. A reactor comprising:
a plurality of coils obtained by winding a winding wire; and
a core that magnetically couples the plurality of coils to each other,
wherein the plurality of coils are arranged parallel to each other such that adjacent outer circumferential surfaces of the plurality of coils are opposed to each other, ends of each of the coils on one side are electrically connected to each other, and the plurality of coils are electrically connected in parallel,
wherein the core comprises:
a plurality of magnetic leg portions around which the plurality of coils are respectively disposed; and
a pair of coupling portions that are disposed at both end portions of the magnetic leg portions and that couple the end portions of the magnetic leg portions adjacent to each other,
wherein the magnetic leg portions include gap materials having a lower magnetic permeability than core piece components of the magnetic leg portions; and
a coupling coefficient adjuster that adjusts a coupling coefficient between adjacent coils,
wherein the coupling coefficient adjuster is disposed between the adjacent coils,
wherein the coupling coefficient adjuster comprises a shielding plate,
wherein a thickness of the coupling coefficient adjuster is between one and two times a coil skin depth, and
wherein the shielding plate is provided at positions corresponding to the gap materials in the magnetic leg portions.

2. The reactor according to claim 1,
wherein the coupling coefficient adjuster comprises a dense winding portion that has a dense winding pitch and a loose winding portion that has a looser winding pitch than the dense winding portion, the dense winding portion and the loose winding portion being provided in at least one of the adjacent coils.

3. The reactor according to claim 1,
wherein the coupling coefficient adjuster has a small-diameter portion that has a small winding diameter and a large-diameter portion that has a larger winding diameter than the small-diameter portion, the small-diameter portion and the large-diameter portion being provided in at least one of the adjacent coils.

4. The reactor according to claim 1,
wherein the coupling coefficient adjuster includes a magnetic gap portion provided in at least one of the coupling portions.

5. A converter equipped with the reactor according to claim 1.

6. A power conversion device equipped with the converter according to claim 5.

7. The reactor according to claim 1,
wherein the coupling coefficient adjuster is disposed between the adjacent coils in a longitudinal direction of the magnetic leg portions.

* * * * *